Aug. 9, 1927.

E. H. SHAFF 1,638,512

PNEUMATIC MOTOR

Filed July 30, 1925

Inventor
Ernest H. Shaff.

Inventor
Ernest H. Shaff.

Aug. 9, 1927.
E. H. SHAFF
1,638,512
PNEUMATIC MOTOR
Filed July 30, 1925
5 Sheets-Sheet 5
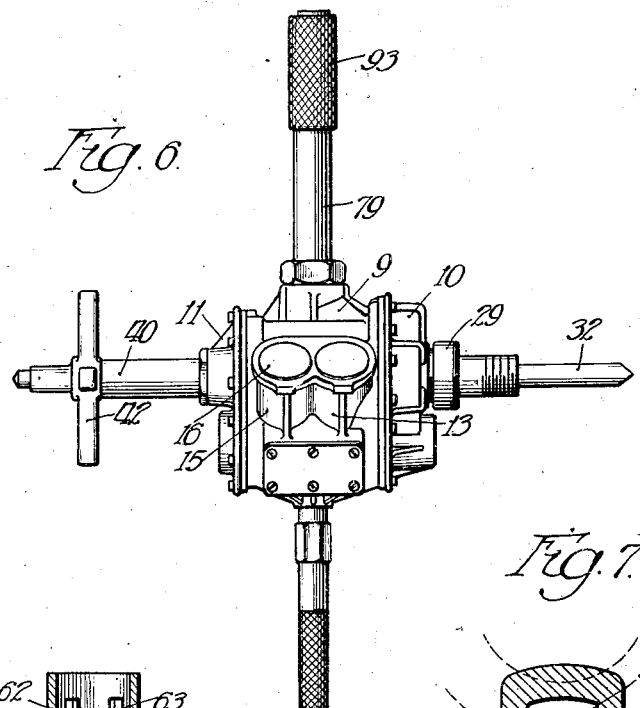
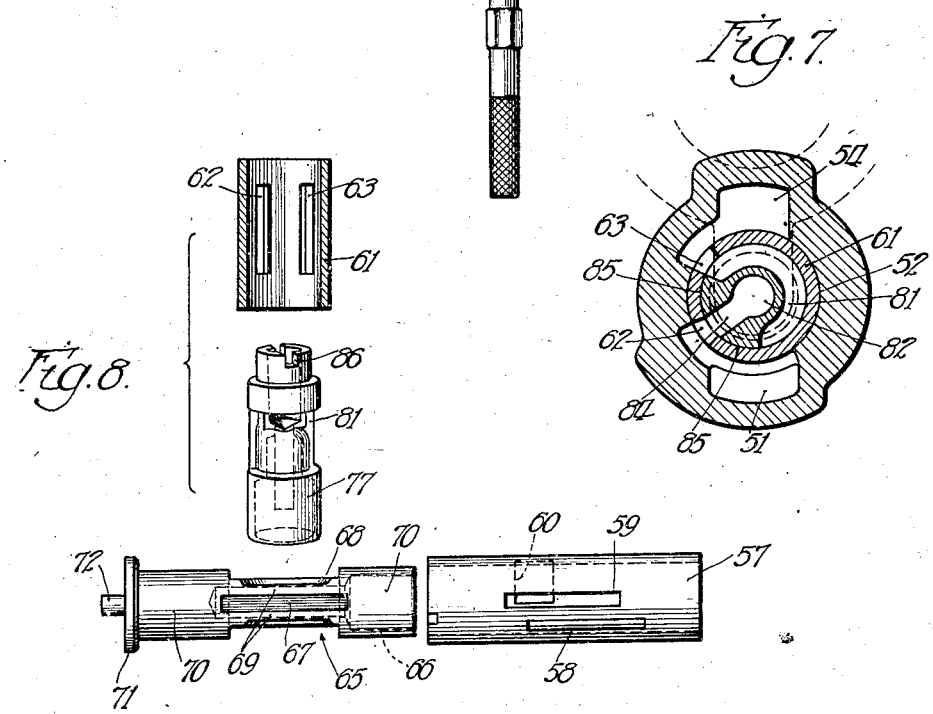
Inventor
Ernest H. Shaff.

Patented Aug. 9, 1927.

1,638,512

UNITED STATES PATENT OFFICE.

ERNEST H. SHAFF, OF GRAND HAVEN, MICHIGAN, ASSIGNOR TO WM. H. KELLER, INC., OF GRAND HAVEN, MICHIGAN, A CORPORATION OF MICHIGAN.

PNEUMATIC MOTOR.

Application filed July 30, 1925. Serial No. 46,964.

The invention relates to improvements in portable pneumatic motors for operating drills and other rotatable tools, and has particular reference to novel valve means for controlling the flow of pressure fluid in said motors.

A general object is to provide a novel pneumatic motor which is simple in construction and efficient in operation.

Further objects reside in the provision of novel valve means for controlling the flow of pressure fluid to and from the cylinders, which means prevents leakage, provides a large bearing surface for the relatively movable valve parts, is simple and small in construction, and makes possible a simplification of the pressure fluid passages in the motor.

Other objects and advantages will become apparent from the following description taken in connection with the accompanying drawings, in which:

Figure 1 is a rear end view of a motor embodying the features of my invention, the rear end cap being removed to expose the interior of the motor.

Fig. 6 is an elevational view of the motor.

Fig. 7 is a sectional detail view taken along line 7—7 of Fig. 1.

Fig. 8 is a composite of a sectional view of the sleeve and a perspective view of the valve member of the supply valve, and elevational views of the sleeve and valve member of one of the admission valves for the cylinders.

Figure 2:
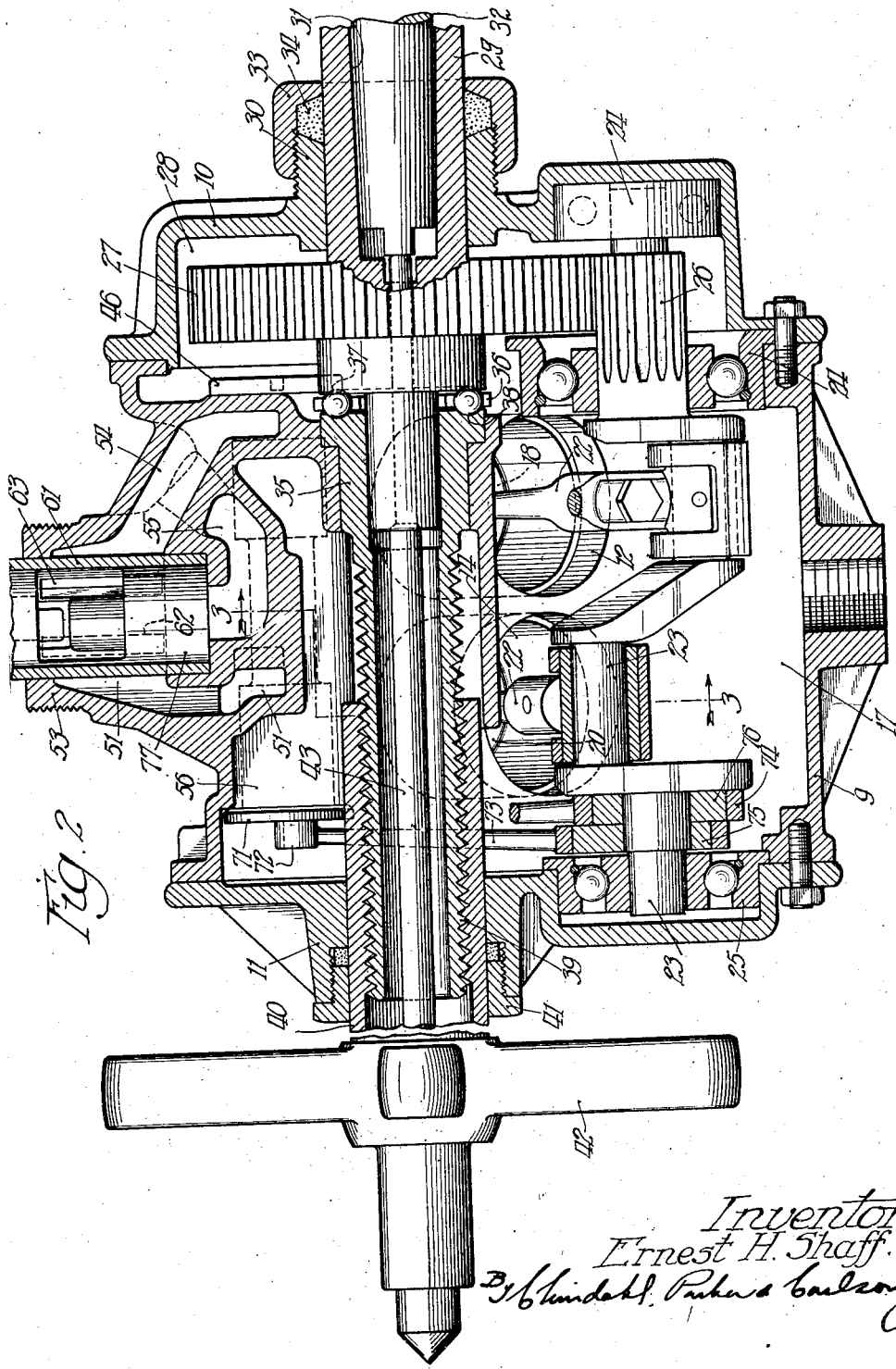
Fig. 2 is a vertical sectional view of the motor taken along line 2—2 of Fig. 1.

While the invention is susceptible of various modifications and alternative constructions, I have shown in the drawings and will herein describe in detail the preferred embodiment thereof, but it is to be understood that I do not thereby intend to limit the invention to the specific form disclosed, but intend to cover all modifications and alternative constructions falling within the spirit and scope of the invention as expressed in the appended claims.

In the exemplary embodiment of the invention shown in the drawings, 9 designates the main casing of the machine which preferably is triangular in shape, and which is closed by removable front and rear end caps or heads 10 and 11 respectively. Four power cylinders 12, 13, 14 and 15 are arranged in front and rear sets of two, and are formed in the opposite side walls of the casing 9, the cylinders of each set being mutually perpendicular, and the cylinders in each side wall being parallel. The outer ends of the cylinders are closed by threaded plugs or caps 16, and the inner ends open into a crank shaft chamber 17 formed in the apex of the casing 9.

Four pistons 18, 19, 20 and 21 (19 not shown) are reciprocably disposed in the cylinders 12, 13, 14 and 15 respectively, and are connected through piston rods 22 to a crank shaft 23 supported at its opposite ends in ball bearings 24 and 25 in the end caps 10 and 11. The piston rods 22 of each set are connected to one crank, and those of the two sets are connected to different cranks of the crank shaft 23, thereby avoiding "dead center" positions and insuring a uniform rotation.

The front end of the crank shaft 23 is provided with a pinion 26 (see Fig. 2) which meshes with a drive gear 27 in a gear chamber 28 formed in the front end cap 10. The gear 27 is rigidly secured on a shaft 29 which extends through a bearing 30 in the front cap 10, and which is formed with a central bore opening into a socket 31 adapted to receive the shank or arbor of a tool 32. A gland nut 33 is threaded onto the outer end of the bearing 30, and serves to clamp a packing ring 34 against the bearing and the shaft 29 to prevent the entrance of dust, grit and other foreign substances. The inner end of the shaft 29 is reduced in size, and is journaled in a bearing 35 rigidly mounted in the interior of the casing 9. A ball bearing 36 is positioned between two circular raceways 37 and 38 formed on the shaft 29 and the bearing 35 respectively, and serves to take up the end thrust of the shaft when the machine is in operation.

Rigidly secured to the bearing 35 and extending rearwardly therefrom centrally through the casing and the rear end cap 11 is a hollow screw 39. An internally threaded screw 40 is threaded onto the screw 39, and is journaled in a bushing 41 in the rear end cap 11. The outer end of the screw 40 is closed and is provided with the usual star handle 42. The screw 40 provides means for actuating an ejecting pin 43 extending through the screw 39 into the shaft 29 to expel the part seated in the socket 31.

Figure 3:
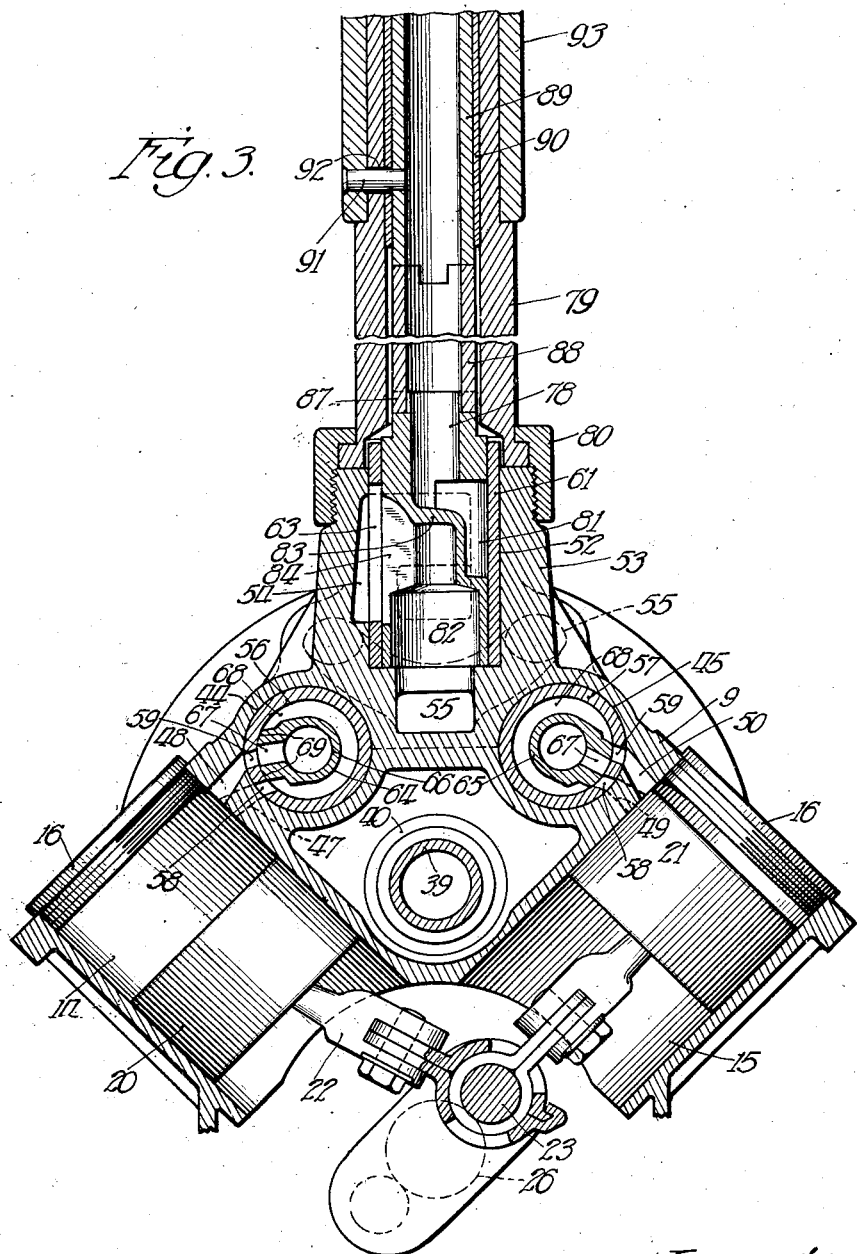
Fig. 3 is a fragmentary sectional view taken substantially along line 3—3 of Fig. 2.
Figure 4:
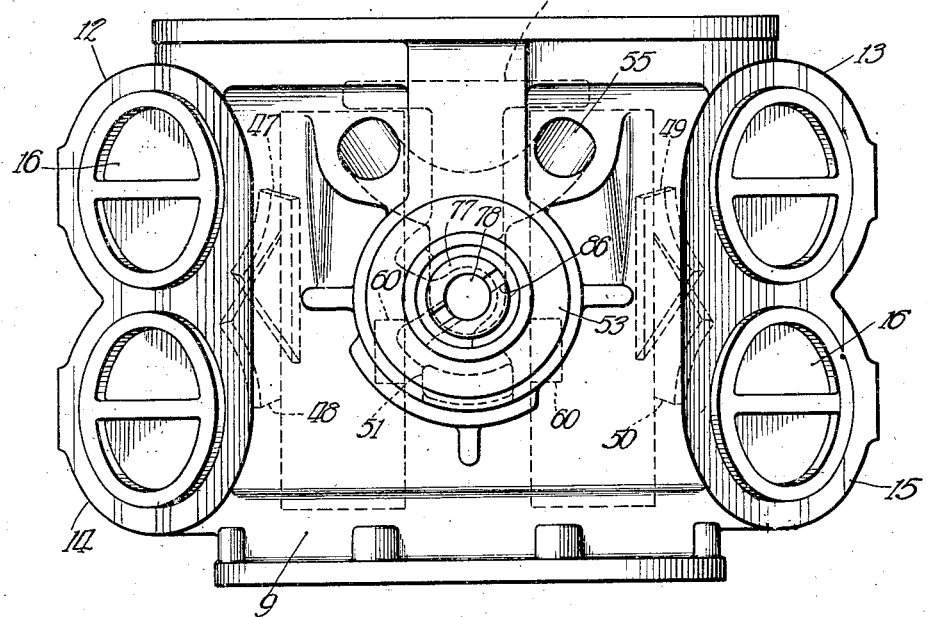
Fig. 4 is a plan view of the motor.
Figure 5:
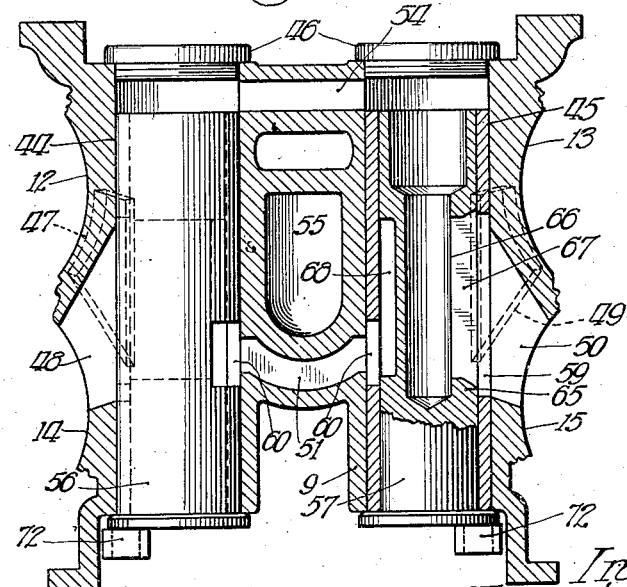
Fig. 5 is a fragmentary sectional view taken along line 5—5 of Fig. 1.

Formed in the side walls of the casing 9 and extending longitudinally thereof between the cylinders are two parallel cylindrical valve chambers 44 and 45, (see Figs. 3 and 5) the front ends of which are closed by threaded plugs 46. The outer side of the chamber 44 communicates substantially midway of its ends through two peripherally spaced passages 47 and 48 with the outer ends of the cylinders 12 and 14. The outer side of the chamber 45 likewise communicates through passages 49 and 50 with the cylinders 14 and 15. Both chambers are connected opposite the passages leading to the cylinders by a forked passage 51 opening into the side of a central valve chamber 52 which is formed in an extension 53 in the casing 9 and which is perpendicular to said first mentioned chambers. The front ends of the chambers 44 and 45 are connected by a second forked passage 54 opening into the chamber 52 opposite the passage 51. The inner end of the central chamber 52 opens into a forked outlet or exhaust passage 55.

Positioned in the chambers 44 and 45, one for each chamber, are two valve sleeves 56 and 57, each valve sleeve having two closely spaced parallel ports 58 and 59 slightly staggered and opening into the passages leading to the cylinders, and having a port 60 opposite said first mentioned ports and opening into the passage 51. The front ends of the sleeves 56 and 57 open into opposite legs of the passage 54. A valve sleeve 61 (see Fig. 7) is also positioned in the central valve chamber 52, and is formed with two parallel closely spaced ports 62 and 63 opening into the passages 51 and 54.

Rotatably mounted in the valve sleeves 56 and 57 are two cylindrical valve members 64 and 65 respectively. Each member is formed with a longitudinal bore 66 opening at its front end into the passage 54. The inner end of the bore 66 opens laterally through a longitudinal slot 67 formed centrally in the side of the member and adapted to be moved alternately into communication with the ports 58 and 59. Each member is also formed in its outer surface at opposite sides of the slot 67 with a peripheral recess 68 constantly in communication with the port 60 and adapted to be brought alternately into communication with the ports 58 and 59. The recess 68 is spaced from the sides of the slot 67 by machined surfaces 69 substantially equal in width to the space between the ports 58 and 59. Normally pressure fluid is admitted through the port 60 to the space defined by the recess 68 about the valve member, and is exhausted through the bore 66. By directing the pressure fluid against the outside of the valve member, the surfaces 69 are held tightly against the inner surface of the sleeve. Since the ports 58 and 59 are located side by side, a single slot 67 and a single recess 68 located centrally on the valve member suffice to direct pressure fluid alternately to and from both cylinders at one side of the casing 9, thereby permitting the use of a relatively short valve member and providing large end bearing surfaces 70. As a result, leakage of pressure fluid past the surfaces 69 is prevented, and simplicity of construction of the valve and of the fluid passages in the casing 9 is obtained.

The rear ends of the valve members 64 and 65 (see Figs. 1 and 2) are provided with heads 71, each head having a suitable crank pin 72 connected through a rod 73 to a ring 74. The rings 74 are mounted on two eccentrics 75 and 76 rigidly secured side by side on the rear end of the crank shaft 23. These eccentrics are adjusted on the shaft 23 to oscillate the valve members 64 and 65 alternately at uniform intervals, and in timed relation to the movements of the pistons so as to create an impulse every 90°.

Adjustably mounted in the valve sleeve 61, is a valve member 77. This member is formed in its outer end with a longitudinal bore 78 adapted to be connected with the source of fluid supply through a handle 79 secured to the extension 53 by means of a gland nut 80. The inner end of the bore 78 opens into a peripheral recess 81 formed in the side of the valve member 77, and adapted to be moved selectively into communication with the ports 62 and 63. Formed in the inner end of the valve member 77 is another longitudinal bore 82 in constant communication with the exhaust passage 55. A thin wall 83 separates the bores 78 and 82. The bore 82 opens through a longitudinal slot 84 in the side of the valve member 77. This slot is adapted to be moved selectively into registration with the ports 62 and 63 alternately with the recess 81, and is separated from the latter by a pair of machined surfaces 85 somewhat greater in width than the space between the ports. It will be evident that the valve member 77 provides means for reversing the rotation of the crank shaft 23, and for controlling the supply of pressure fluid to the motor.

To provide means for adjusting the valve member 77, it is formed with a diametrical notch 86 fitting over a key 87 on one end of a sleeve 88 in the handle 79. The other end of the sleeve 88 is keyed to a sleeve 89 rotatably adjustable in a bushing 90 in the handle. A pin 91 rigidly secured to the sleeve 89 extends outwardly through two arcuate slots 92 in the handle 79 and bushing 90, and is rigidly connected to a knurled adjusting sleeve 93, rotatably but non-slidably mounted on the handle.

In operation, the valve member 77 is normally positioned to direct pressure fluid into the passage 51 and exhaust it from the passage 54. The course of the pressure fluid, selecting the cylinder 14 for illustration, is as follows: from the passage 51, through the recess 68, the port 59 and the passage 48 to the cylinder 14 when the recess 68 and the port 59 are in communication, and from the cylinder 14, through the passage 48, the port 59, the slot 67 and the bore 66 to the passage 54 when the slot 67 and the port 59 are in registration. From the passage 54 the exhaust fluid passes through the port 63, the recess 81 and the exhaust passage 55 to the atmosphere. The pressure fluid presses the valve member tightly against the sleeve 56, thereby preventing leakage from the recess 68 past the surfaces 69 to the slot 67. To reverse the action of the motor for withdrawing the tool 32 from the work, the valve member 77 is oscillated manually to connect the recess 81 and the slot 84 with the ports 63 and 62 respectively, thereby reversing the course of the pressure fluid.

I claim as my invention:

1. A pneumatic motor having, in combination, a V-shaped casing, a plurality of cylinders formed in the sides of said casing, the cylinders in each side being parallel, and in opposite sides being mutually perpendicular, a crank shaft, pistons in said cylinders and operatively connected to said crank shaft, a pair of parallel valve chambers formed in said casing in the angle between said cylinders and extending perpendicularly thereto, two pairs of passages, the passages of each pair opening side by side into one of said chambers and centrally thereof and connecting same respectively with the adjacent parallel cylinders, two sleeves, one in each chamber and each sleeve having ports registering with said passages, a pair of valve members, one rotatable in each sleeve and each member having a longitudinal bore in one end opening into a central longitudinal slot and having a peripheral recess opposite said slot, said slot and said recess being adapted to be moved alternately and successively into communication with said ports, means connecting said valve members to said crank shaft to drive the former in synchronism with said pistons, a central valve chamber in said casing, a forked passage connecting said central chamber with the interior of said sleeves opposite said first mentioned passages for continuous communication with said recesses, a second forked passage connecting said central chamber with the ends of said sleeves, and valve means in said central chamber for selectively controlling the passage of pressure fluid through said forked passages.

2. A pneumatic motor having, in combination, a V-shaped casing, a plurality of cylinders formed in the sides of said casing, pistons in said cylinders, a crank shaft journaled in said casing, means operatively connecting said pistons to said crank shaft, a pair of valve chambers one for the cylinders in each side of said casing, two pairs of passages, the passages of each pair opening respectively into the outer ends of the cylinders in one side of the casing and opening side by side into the corresponding valve chamber, a pair of valve members one rotatable in each chamber, each member having a longitudinal bore in one end terminating in a longitudinal slot and having a peripheral recess opposite said slot, means connecting said valve members to said crank shaft to move the slot and recess of each member alternately and successively into registration with the passages associated therewith, means for directing pressure fluid to said recesses and for exhausting pressure fluid from said bores.

3. A pneumatic motor having, in combination, a casing, a pair of cylinders formed in said casing, a valve chamber for said cylinders, passages connecting the outer ends of said cylinders with said chamber, said passages opening into said chamber side by side and substantially midway of its ends, a valve member rotatably mounted in said chamber, said valve member having a longitudinal bore terminating in a longitudinal slot substantially midway of its ends and having a peripheral recess opposite said slot, said slot and said recess being adapted to be moved successively and alternately into and out of registration with the openings of said passages, pistons in said cylinders, a crank shaft connected to said pistons, means automatically operable to oscillate said valve member in timed relation to the movements of said pistons, and means for directing pressure fluid to said recess and from said bore, said means being adjustable to reverse the course of said pressure fluid.

4. A pneumatic motor having, in combination, a casing, a pair of cylinders formed in said casing, a valve chamber for said cylinders, passages connecting said cylinders with said chamber, said passages opening into said chamber side by side, a valve member rotatably mounted in said chamber, said valve member having a longitudinal slot and having a peripheral recess directly opposite said slot, said slot and said recess being adapted to be moved successively and alternately into and out of registration with said passages, pistons in said cylinders, a crank shaft connected to said pistons, means for automatically operating said valve member, and means for directing pressure fluid to said recess and from said slot, said means being reversible to direct pressure fluid to said slot and from said recess.

In testimony whereof, I have hereunto affixed my signature.

ERNEST H. SHAFF.